Patented Apr. 11, 1950

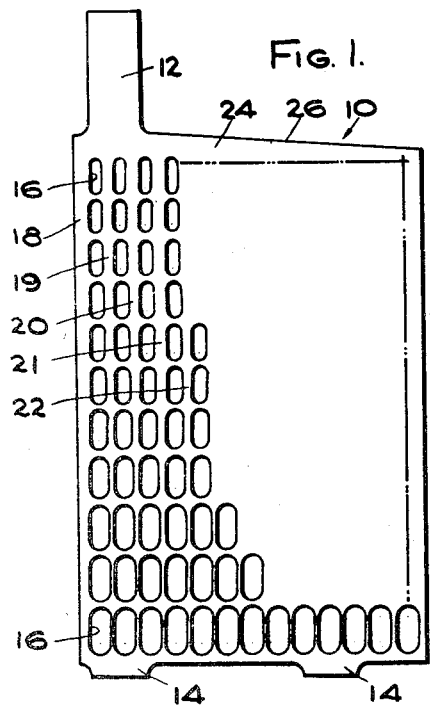
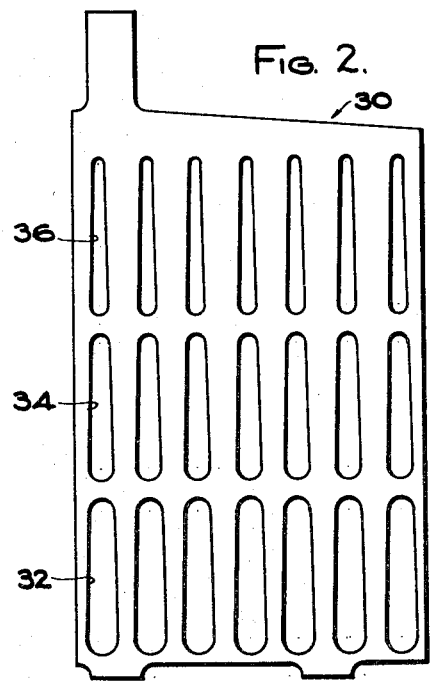
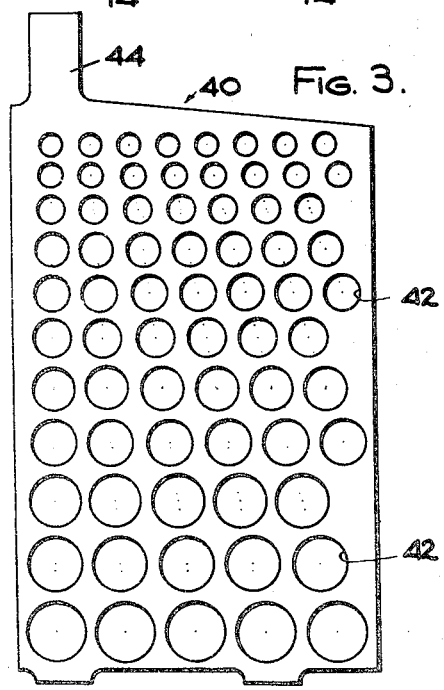
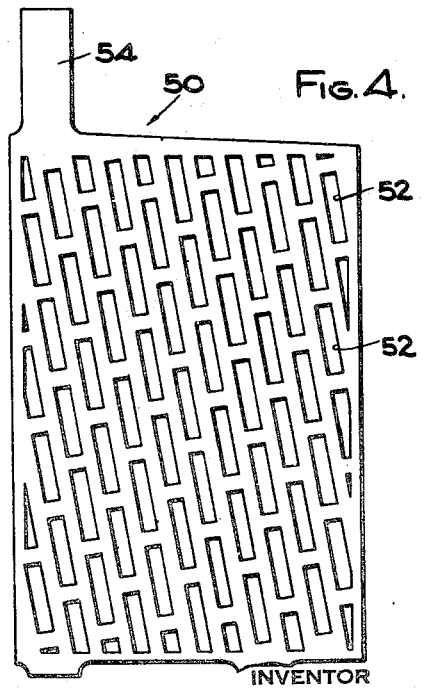

2,503,970

UNITED STATES PATENT OFFICE 2,503,970

STORAGE BATTERY GRID

John L. Rupp, Williamsville, N. Y., assignor to National Battery Company, St. Paul, Minn.

Application May 12, 1945, Serial No. 593,369

1 Claim. (Cl. 136—38)

This invention relates to storage batteries, and more particularly to improvements in storage battery grids or electrodes of perforated metal plate form for holding battery active paste materials within the perforations thereof.

One of the objects of the invention is to provide a paste carrying electrode or grid for storage batteries or the like wherein the paste mounting apertures thereof are so formed and relatively arranged as to provide overall improved current conductivity characteristics throughout the grid structure.

Another object of the invention is to provide an improved storage battery pasted grid in which the current conducting metallic structures between the grid apertures vary in sectional dimensions throughout the grid structure so as to provide therein current conduction capacities in proportion to the current loads thereon.

Another object of the invention is to provide an improved storage battery pasted grid wherein the current conducting structural elements of the grid which extend generally in the direction of current conduction to the grid terminal element are of increasing sectional area dimensions toward their terminal ends in approximate proportion to the increases of current loads thereon due to their current collecting functions.

Another object of the invention is to provide an improved storage battery grid comprising in effect a perforate metallic plate device comprising a plurality of paste receiving pockets margined by primary metallic strands extending generally in the direction of current conduction toward the grid terminal element and by transverse secondary metallic strands for laterally bracing the primary strands; said primary strands being of gradually increasing sectional area dimensions as they extend into the region of the grid terminal element so as to be adapted to function in improved manner as battery current collectors and conductors into the terminal element.

Another object of the invention is to provide an improved battery grid structure wherein the primary metallic strands aforesaid are disposed to extend substantially in the direction of the terminal element of the grid for improved direction of conduction of collected currents.

Another object of the invention is to provide the objects and features aforesaid in combination with a structurally simple and practicable grid construction.

Other objects and advantages of the invention will appear in the specification hereinafter.

In the drawing:

Fig. 1 is a fragmentary elevation of a storage battery grid embodying a form of the invention; and Figs. 2, 3 and 4 are views similar to Fig. 1, but showing other forms of the invention.

The invention is illustrated for example in Fig. 1 in conjunction with a storage battery grid 10 comprising generally a perforated plate of lead or lead-antimony alloy or other metal or metallic alloy structure. The grid is of generally rectangular form and so dimensioned as to fit into the battery case in combination with a plurality of alternately disposed positive and negative plate devices, as is well known in the art. The grid 10 is illustrated to include a customary terminal element 12 which extends integrally therewith and from an upper corner of the grid for attachment to a bus bar or other current conducting terminal device leading through the top cover of the battery case. The terminal elements of such battery grids are so disposed at upper corners thereof so as to be in position to connect with the battery case terminal device which in turn must for practical purposes be disposed at one side of the top cover of the battery case. Also as is customary, the grid 10 is illustrated to include a pair of foot portions 14—14 extending therebelow for vertically supporting the grid interiorly of the battery case in substantially spaced relation from the floor of the case.

The paste-receiving pockets of the grid 10 are illustrated in Fig. 1 to comprise apertures 16 which may be formed to extend through the grid structure either during the process of casting the grid into the form illustrated or by punching such apertures through a flat plate-like stock piece of metal. In either case, the apertures are so arranged as to provide the metallic strands extending vertically of the grid to be of gradually increasing sectional area dimensions toward the upper end of the grid. Inasmuch as it is impracticable to increase the grid thickness in a direction normal to the plane of the drawing herein because of space and shape limitations controlled by the battery case shape requirements, the present invention contemplates that the vertical strands of the grid metal, as indicated at 18—19—20—21—22 for example, be gradually increasing in width as they approach the upper end of the grid. This provides the vertical metal strands of the grid to be of gradually increasing current conducting capacities as they approach the upper end of the grid.

The above stated object may be attained as shown in Fig. 1 by arranging the apertures 16 in both horizontal and vertical rows and by disposing the vertical row center lines to be mutually parallel while forming the apertures to be of reduced widths as they approach the upper end of the grid. Thus, the spaces between the vertical rows of apertures increase toward the upper end of the grid and the sectional area dimensions thereof are correspondingly increased. The invention further contemplates that the aperture width dimensions be so regulated that the rate of increase of sectional area of the vertical strands is in proportion to the increase of current loads thereon as a consequence of their functioning to collect and converge the grid generated currents upon the terminal 12. The currents referred to are those resulting from the electrochemical action of the paste material at all portions of the grid structure, which currents are collected and directed into the terminal element 12.

The horizontal strand of metal of the grid structure at the extreme upper end thereof as indicated at 24 which is defined between the upper edge 26 of the grid and the upper horizontal row of paste carrying apertures will also be preferably formed as shown so as to be of increased sectional area from right to left as viewed in Fig. 1. Thus, it will be of increased current conduction capacity as it approaches the terminal element 12 in order to function more effectively as a collector of currents from the vertically extending metal strands of the grid for delivery to the terminal element. This effect is obtained by sloping the upper edge 26 of the grid element upwardly toward the terminal portion 12 while maintaining the upper row of apertures in horizontal attitude.

It will be understood of course that the apertures 16 will preferably be so shaped as to provide most effective retention of the paste supplies mounted therein and to provide maximum paste areas vs. grid material areas compatible with current conduction requirements and physical strength requirements in the grid metal structure. For example, as shown in Fig. 1, the apertures 16 may be lozenge-shaped so as to be greater in vertical dimension than transversely thereof, thereby accommodating adequate volumes of paste material while providing the paste masses to be of reduced transverse dimensions. Thus, the paste will be adequately exposed to the battery electrolyte and adequately supported physically so as to prevent them from sloughing out of the grid apertures. The rounded end formations of the lozenge-shaped apertures 16 may also be preferred in comparison to squared end formations because of the structural corner reinforcements thereby provided for the metallic grid strand portions.

Fig. 2 illustrates another form of battery grid of the invention wherein the grid structure 20 is generally of the type and formation of the grid 10 of Fig. 1 except for the mode of formation and arrangement of the paste carrying apertures therein. As illustrated in Fig. 2 the paste carrying apertures are provided to be substantially elongated vertically for maximum paste carrying capacity under conditions permitting provision of relatively large paste mounting pockets, such as when the pasted grids are to be assembled within paste retainer mats or envelopes. Thus, the grid 30 is illustrated to include a relatively small number of rows of apertures 32, 34, 36; the bottom row of apertures 32 being of greater width than the middle row of apertures; and the upper row of apertures being substantially narrower, whereby the increased current conduction capacity within the vertical strands of the grid structures is obtained as explained hereinabove. More specifically, in an arrangement such as illustrated in Fig. 2, in order to attain the objects of the invention to an optimum degree the paste carrying apertures 32, 34, 36 are preferably formed to taper in the directions of their vertical extents, whereby the vertically extending strands of the grid metal structure are of constantly increasing sectional areas as they approach the terminal end of the grid. Thus, the grid structure may be so formed and arranged as to provide for current conduction capacities in the grid metal structure in exact proportion to the current loads thereon throughout all portions of the grid structure. Therefore minimum grid metal may be employed while avoiding overloading any portion of the grid structure.

Fig. 3 illustrates another form of grid aperture arrangement of the invention wherein grid apertures of circular contour are employed and so arranged as to extend in horizontal rows and in vertically divergent rows so as to dispose the vertical strands of grid metal between adjacent vertical rows of apertures to be substantially convergent toward the position of the terminal element of the grid. Also, each vertically ascending horizontal row of apertures 42 is provided of apertures of smaller diameter whereby the width dimensions of the generally vertical strands of grid metal between vertical rows of apertures gradually increase toward the region of the terminal element 44. Thus the grid of Fig. 3 may be constructed to provide current conduction capacity throughout the entire grid structure in direct proportion to the current loads thereon as explained hereinabove as well as providing the additional feature of being adapted to conduct the vertically rising battery currents to flow more directly toward the position of the terminal element 44.

A battery grid is illustrated at 50 in Fig. 4 as being generally similar to the previously described grids except that the paste carrying apertures 52 therein are illustrated to be of rectangular contour and arranged in inclined parallel rows so as to dispose the generally vertically extending strands of grid metal therebetween to be directed generally toward the grid terminal element 54. Thus, an improved directing of the battery currents into the grid terminal is attained as explained hereinabove. Preferably, the apertures 52 will be arranged in staggered relation in horizontal directions as illustrated in Fig. 4, in order to attain improved structural ruggedness in the grid metal.

Although only a few forms of the invention have been shown and described in detail, it will be apparent to those skilled in the art that the invention is not so limited but that various changes may be made therein without departing from the spirit of the invention or the scope of the appended claim.

What is claimed is:

A storage battery grid comprising a metal member apertured to provide paste-carrying sockets therein and having a grid terminal at one end of said member, said sockets being longitudinally aligned in parallel rows extending toward the grid terminal end of said plate, said sockets being of constant longitudinal dimension and arranged in tiers of equal number sockets, said tiers extending transversely to said parallel rows, the sockets of successive tiers as they approach the grid terminal end of said member being of such gradually reduced transverse dimensions as to provide straight-line strands of metal between said rows to be of gradually increasing widths as they approach said terminal end, the width of each said strand at each said tier being closely proportional to the combined area of all said sockets lying between said tier and the end of the grid member opposite said terminal end.

JOHN L. RUPP.

REFERENCES CITED

The following references are of record in the file of this patent:

UNITED STATES PATENTS

| Number | Name | Date |
|---|---|---|
| 693,453 | Silvey | Feb. 18, 1902 |
| 1,044,831 | Wackwitz | Nov. 19, 1912 |
| 1,069,809 | Prince | Aug. 12, 1913 |
| 1,129,690 | Knoblock | Feb. 23, 1915 |
| 1,529,681 | Allen | Mar. 17, 1925 |
| 1,933,928 | Perkins | Nov. 7, 1933 |
| 2,064,324 | Schnaubelt | Dec. 15, 1936 |